(12) United States Patent
Okamura et al.

(10) Patent No.: US 7,643,544 B2
(45) Date of Patent: Jan. 5, 2010

(54) COMMUNICATION QUALITY CONTROLLER AND A COMMUNICATION QUALITY CONTROL METHOD

(75) Inventors: Yusaku Okamura, Tokyo (JP); Taisuke Goto, Tokyo (JP)

(73) Assignee: NEC Corporation, Tokyo (JP)

( * ) Notice: Subject to any disclaimer, the term of this patent is extended or adjusted under 35 U.S.C. 154(b) by 655 days.

(21) Appl. No.: 11/143,662

(22) Filed: Jun. 3, 2005

(65) Prior Publication Data
US 2005/0271153 A1 Dec. 8, 2005

(30) Foreign Application Priority Data
Jun. 4, 2004 (JP) ............................. 2004-167645

(51) Int. Cl.
*H04B 1/38* (2006.01)
(52) U.S. Cl. .................................... 375/222
(58) Field of Classification Search .............. 375/219, 375/222, 260, 267, 224, 225
See application file for complete search history.

(56) References Cited

U.S. PATENT DOCUMENTS

| | | | | |
|---|---|---|---|---|
| 5,574,979 A | * | 11/1996 | West | .......................... 455/63.1 |
| 6,549,520 B1 | * | 4/2003 | Gross et al. | .................. 370/242 |
| 6,760,368 B1 | | 7/2004 | Arai et al. | |
| 7,079,812 B2 | * | 7/2006 | Miller et al. | ............... 455/63.1 |
| 7,274,746 B2 | * | 9/2007 | Bailey | .......................... 375/285 |
| 2005/0152533 A1 | * | 7/2005 | Zhou | ..................... 379/399.01 |

FOREIGN PATENT DOCUMENTS

| | | | |
|---|---|---|---|
| JP | 2000-013343 A | 4/2000 | |
| JP | 2000-295364 A | 10/2000 | |
| JP | 2003-23402 A | 1/2003 | |

* cited by examiner

*Primary Examiner*—Chieh M. Fan
*Assistant Examiner*—Freshteh N Aghdam
(74) *Attorney, Agent, or Firm*—Foley & Lardner LLP

(57) ABSTRACT

A communication quality controller can avoid, when periodically changing noise is abruptly occurring, disconnection of a communication line used for data communication and prevent resetting of a link speed for the data communication. During the data transmission at a beforehand set link speed, a CRC error counter monitors for a predetermined period of time whether or not an error occurs in a CRC error detector at a period less than a noise period changing periodically. According to presence or absence of the error taking place during the monitoring by the counter, a periodic noise detector determines presence or absence of a periodic noise period abruptly taking place. If presence of the periodic noise is determined, disconnection of an associated communication line is avoided, and after the occurrence of the periodic noise is terminated, the data communication is conducted at the link speed.

8 Claims, 12 Drawing Sheets

FIG. 8 PRIOR ART

ISDN DIRECTION CHANGE TIMING

|     | 0   | 1   | 2   | 3   | 4   | 5   | 6   | 7   | 8   | 9   |
|-----|-----|-----|-----|-----|-----|-----|-----|-----|-----|-----|
| 0   | 0   | 1   | 2   | 3   | 4   | 5   | 6   | 7   | 8   | 9   |
| 1   | 10  | 11  | 12  | 13  | 14  | 15  | 16  | 17  | 18  | 19  |
| 2   | 20  | 21  | 22  | 23  | 24  | 25  | 26  | 27  | 28  | 29  |
| 3   | 30  | 31  | 32  | 33  | 34  | 35  | 36  | 37  | 38  | 39  | 40 |
| 4   |     | 41  | 42  | 43  | 44  | 45  | 46  | 47  | 48  | 49  | 50 |
| 5   | 51  | 52  | 53  | 54  | 55  | 56  | 57  | 58  | 59  | 60  |
| 6   | 61  | 62  | 63  | 64  | 65  | 66  | 67  | SS  | 69  | 70  |
| 7   | 71  | 72  | 73  | 74  | 75  | 76  | 77  | 78  | 79  | 80  |
| 8   | 81  | 82  | 83  | 84  | 85  | 86  | 87  | 88  | 89  | 90  |
| 9   | 91  | 92  | 93  | 94  | 95  | 96  | 97  | 98  | 99  | 100 | 101 |
| 10  | 101 | 102 | 103 | 104 | 105 | 106 | 107 | 108 | 109 | 110 | 111 |
| 11  | 112 | 113 | 114 | 115 | 116 | 117 | 118 | 119 | 120 | 121 |
| 12  | 122 | 123 | 124 | 125 | 126 | 127 | 128 | 129 | 130 | 131 |
| 13  | 132 | 133 | 134 | 135 | 136 | SS  | 138 | 139 | 140 | 141 |
| 14  | 142 | 143 | 144 | 145 | 146 | 147 | 148 | 149 | 150 | 151 |
| 15  | 152 | 153 | 154 | 155 | 156 | 157 | 158 | 159 | 160 | 161 |
| 16  | 162 | 163 | 164 | 165 | 166 | 167 | 168 | 169 | 170 | 171 | 172 |
| 17  | 173 | 174 | 175 | 176 | 177 | 178 | 179 | 180 | 181 | 182 |
| 18  | 183 | 184 | 185 | 186 | 187 | 188 | 189 | 190 | 191 | 192 |
| 19  | 193 | 194 | 195 | 196 | 197 | 198 | 199 | 200 | 201 | 202 |
| 20  | 203 | 204 | 205 | SS  | 207 | 208 | 209 | 210 | 211 | 212 |
| 21  | 213 | 214 | 215 | 216 | 217 | 218 | 219 | 220 | 221 | 222 |
| 22  | 223 | 224 | 225 | 226 | 227 | 228 | 229 | 230 | 231 | 232 |
| 23  | 233 | 234 | 235 | 236 | 237 | 238 | 239 | 240 | 241 | 242 | 243 |
| 24  | 244 | 245 | 246 | 247 | 248 | 249 | 250 | 251 | 252 | 253 |
| 25  | 254 | 255 | 256 | 257 | 258 | 259 | 260 | 261 | 262 | 263 |
| 26  | 264 | 265 | 266 | 267 | 268 | 269 | 270 | 271 | 272 | 273 |
| 27  | 274 | ISS | 276 | 277 | 278 | 279 | 280 | 281 | 282 | 283 |
| 28  | 284 | 285 | 286 | 287 | 288 | 289 | 290 | 291 | 292 | 293 |
| 29  | 294 | 295 | 296 | 297 | 298 | 299 | 300 | 301 | 302 | 303 |
| 30  | 304 | 305 | 306 | 307 | 308 | 309 | 310 | 311 | 312 | 313 | 314 |
| 31  | 315 | 316 | 317 | 318 | 319 | 320 | 321 | 322 | 323 | 324 |
| 32  | 325 | 326 | 327 | 328 | 329 | 330 | 331 | 332 | 333 | 334 |
| 33  | 335 | 336 | 337 | 338 | 339 | 340 | 341 | 342 | 343 | SS  |

A     B

▨ FEXTr DATA SYMBOL     ☐ NEXTr DATA SYMBOL

BIT MAP CHANGE SCHEME

COMMUNICATION QUALITY CONTROLLER AND A COMMUNICATION QUALITY CONTROL METHOD

BACKGROUND OF THE INVENTION

1. Field of the Invention

The present invention relates to a multicarrier transmission system employed for an x Digital Subscriber Line (xDSL; x generically stands for A, S, V, etc.) for high-speed data transmission at several megabits (MB) per second using a metallic cable such as a telephone line, and in particular, to a communication quality controller and a communication quality control method to control a link bit rate or a link speed of data transmission in a noisy environment where a noise level changes at known timing.

2. Description of the Prior Art

Recently, attention has been drawn to an xDSL technology which makes it possible to transmit data at a high speed of several megabits per second through a metallic cable such as a telephone line. Particularly, attention is paid to the ADSL in which upstream and downstream transmission speeds differ from each other. The asymmetric characteristic is suitable for access to the Internet.

Referring now to FIG. 1, description will be given of a configuration of an ADSL transmission apparatus to receive ADSL services. The apparatus includes a personal computer (PC) 100, an ADSL modem 101, a splitter (SPL) 102, a modular jack (MJ) 103, and a protective device 105.

To access the ADSL service system, the PC 100 is connected via the ADSL modem 101 and the splitter 102 to the modular jack 103. The modem 101 is a device to conduct signal conversions between a digital signal for the PC 100 and an analog signal for transmission through a subscriber line, i.e., a metallic cable. The splitter 102 is adopted to separate a call signal and a data signal for ADSL in the metallic cable. For the call signal, the splitter 102 is linked with a port on a telephone side 104. For the data signal, the splitter 102 is coupled with a port on an ADSL home unit or an ADSL subscriber unit (101, 100). As shown in FIG. 1, the ADSL service system also includes a communication office for the ADSL service. The office includes a main distribution frame (MDF) 204, a splitter 203, a digital subscriber line multiplexer (DSLAM) 201, and switching equipment or an telephone exchange 202.

As can be seen from FIG. 1, the protector 105 is connected via a metallic cable to the distributor 204 linked with the splitter 203. For a call signal, the splitter 203 is coupled with the switching equipment 202. For an ADSL signal, the splitter 203 is linked with a multiplexer side, i.e., the DSLAM 201, which is to be connected via a provider to the Internet. The multiplexer 201 converts data transmitted in the form of an analog signal into a digital signal to transmit the digital signal to the provider.

An ADSL transmission device converts, before transmission of a digital signal, the digital signal into an analog signal according to a modulation and demodulation method called "Discrete Multi-Tone (DMT)" method. In the method, Quadrature Amplitude/Phase modulation (QAM) is conducted for 256 carriers and the modulated carriers are multiplexed by use of an inverse Fourier transform to send the obtained signal therefrom. On a receiving side of the signal, each carrier is extracted from the multiplexed signal using a Fourier transform to achieve demodulation of the QAM modulated signal. As a result, data can be transmitted at a high transmission rate.

However, in the ADSL transmission apparatus, when a bundle of cables includes ISDN cables and ADSL cables, there takes place noise due to influence of the ISDN cables. This reduces the transmission rate of the ADSL line. Crosstalk noise from the ISDN line most adversely affects the ADSL line. To cope with this difficulty, it is also possible to separate the ISDN cables from the ADSL cables such that the bundle of ISDN cables do not include any ADSL cable. This however imposes quite a high burden to the operator. It is hence desired to provide a data transmission method capable of securing a predetermined transmission rate or speed regardless of the crosstalk noise occurring when ISDN and ADSL cables are arranged in one bundle of cables.

Referring now to FIG. 2, description will be given of crosstalk noise taking place in the ADSL device when a time compression multiplexing (TCM) ISDN cable is employed as a line adjacent to an ADSL cable. The diagram of FIG. 2 shows crosstalk noise occurring in an ADSL Transceiver Unit—Remote side (ATU-R) as a unit on a terminal side of the ADSL device when data is transmitted via a TCM-ISDN cable while data transmission is being carried out in a downstream direction via an ADSL cable.

On the TCM ISDN cable, data transmission is alternately accomplished in the upstream direction and the downstream direction at an interval of time of 1.25 milliseconds (ms). When data transmission is conducted in the upstream direction via the TCM-ISDN cable while data transmission is being carried out in the downstream direction via the ADSL cable, a high-power signal before attenuation from the TCM-ISDN line affects an attenuated signal on the ADSL line. This causes a Near End Cross Talk (NEXT) on the terminal ATU-R.

When data is transmitted in the downstream direction via the TCM-ISDN cable while data is being sent in the upstream direction via the ADSL cable, a signal on the TCM-ISDN line affects an attenuated signal on the ADSL line. This results in a Far End Cross Talk (FEXT) on the terminal ATU-R. The phenomenon also occurs on an ADSL Transceiver Unit—Center Side (ATU-C) on the side of a central station.

Next, the quantity of crosstalk noise will be described by referring to FIG. 3, which indicates the crosstalk noise quantity. As can be seen from FIG. 3, the quantity of the noise at occurrence of the near end crosstalk is more than that at occurrence of the far end crosstalk. This is because the high-power signal before attenuation from the TCM-ISDN cable exerts influence upon the attenuated signal on the ADSL line. Paying attention to the difference in quantity between the noise at the NEXT and that at the FEXT, there has been proposed a method of transmitting signals by altering the data transfer rate between the states respectively associated with the near end crosstalk and the far end crosstalk. This is called a dual bit map method. As can be seen from FIG. 3, the quantity of transmission data or the transmission rate is increased at occurrence of the far end crosstalk (FEXT) with a small quantity of noise while the transmission rate is reduced at occurrence of the near end crosstalk (NEXT) with a large quantity of noise.

As above, the noise quantity periodically varies in the ADSL transmission device in which the TCM ISDN cable is adjacent to the ADSL cable. Therefore, a Signal to Noise Ratio (SNR) of each carrier is measured in each of the upstream and downstream directions to determine distribution of bits according to the measured SNR.

Referring next to FIG. 4, description will be given of the ADSL transmission module of the prior art.

Configuration on ATU-C (300) Side

The ATU-C 300 includes on its transmission side a Cyclic Redundancy Check (CRC) processing unit 315 to add a CRC code to data sent from a higher-rank device, a scramble processing and error correcting (scram & Forward Error Correction (FEC)) unit 301 which executes scramble processing for the data with the CRC code added by the unit 315 and which adds a Reed-Solomon error correction code to the data, a mapping unit 302 which changes transmission power distribution and bit distribution for each carrier according to timing of change in a noise level to achieve bit distribution and transmission power distribution for the carrier, an inverse Fourier transform unit 303 which modulates and multiplexes an output signal from the mapping unit 302, i.e., a multivalue quadrature amplitude modulation (QAM) signal using each carrier, and a digital-to-analog (D/A) converting unit 304 which converts a multiplexed output signal from the unit 303 into an analog signal to transmit the analog signal therefrom.

The ATU-C 300 includes a receiving unit including an analog-to-digital (A/D) converting unit 305 for converting an analog signal from the ATU-R 400 into a digital signal, a Fourier transform unit 306 which conducts Fourier transform for the digital signal from the unit 305, a mapping unit 307 to change bit distribution and transmission power distribution for each carrier according to timing of change in a noise level to thereby demodulate the signal from the unit 306, a scramble processing and error correcting (scram & FEC) unit 308 which corrects errors to restore original data, and a CRC error detecting unit 314 to detect a CRC error.

Configuration on ATU-R 400 Side

The ATU-R 400 includes a transmission side including a CRC processing unit 415 to add a CRC code to data from a higher-rank device, a scramble processing and error correcting (scram & FEC) unit 401 which executes scramble processing for the data from the unit 415 and which adds a Reed-Solomon error correction code to the data, a mapping unit 402 which changes transmission power distribution and bit distribution for each carrier according to timing of a noise-level change to achieve bit distribution and transmission power distribution for the carrier, an inverse Fourier transform unit 403 for modulating and multiplexing an output signal from the unit 402, i.e., a multivalue QAM signal using each carrier, and a D/A converting unit 404 which converts a multiplexed output signal from the unit 403 into an analog signal to transmit the analog signal as a forward signal.

The ATU-R 400 includes a receiver module including an A/D converter 408 for converting an analog signal from the ATU-C 300 into a digital signal, a Fourier transform unit 407 to conduct a Fourier transform for the digital signal from the unit 408, a mapping unit 406 to change bit distribution and transmission power distribution according to timing of change in a noise level to thereby demodulate the signal from the unit 407, a scramble processing and error correcting (scram & FEC) unit 405 which corrects errors to restore original data, and a CRC error detecting unit 414 for checking, using a predetermined expression, the CRC code added to the data to detect a CRC error.

The ATU-C 300 includes a pseudo random signal generator 310 and a bit power distribution calculator 312. The ATU-R 400 includes a pseudo random signal generator 409 and a bit power distribution calculator 410. FIG. 5 shows in detail the configuration of the calculator 312. FIG. 6 shows a detailed configuration of the calculator 410.

During ISDN data transmission in the downstream direction, near end crosstalk (NEXT) occurs in the ATU-C 300 and far end crosstalk (FEXT) takes place in the ATU-R 400.

During ISDN data transmission in the upstream direction, FEXT occurs in the ATU-C 300 and NEXT takes place in the ATU-R 400.

To secure the data transmission capacity in the noise environment, the pseudo random signal generator (310, 409) sequentially assigns, to the carriers for data transmission, data forming a predetermined pseudo random series to resultantly create a pseudo random signal and passes the signal to the inverse Fourier transform unit (303, 403) for transmission thereof to the associated unit of the communicating station.

Using the pseudo random signal produced from the generator (409, 310) of the station, the bit-power distribution calculator (312, 410) obtains, at occurrence of NEXT and at occurrence FEXT, bit distribution and transmission power distribution for each carrier.

The bit distribution and the transmission power distribution are stored in the demapping unit (307, 406) of the own station and the mapping unit (302, 402) of the communicating station.

Description will now be given in detail of a processing flow to attain the bit distribution and the transmission power distribution. Since the ATU-C 300 and the ATU-R 400 execute the same processing, description will be given only of processing to determine the bit distribution and the transmission power distribution in the downstream direction.

During a training period to calculate the bit distribution for each carrier and the transmission power distribution for each carrier, the generator 310 modulates amplitude of each carrier for data transmission to obtain amplitude corresponding to a sequence of bits of a predetermined data assigned according to a predetermined pseudo random series and then delivers the resultant signal to the inverse Fourier transform unit 303.

The unit 303 carries out an inverse Fourier transform for each carrier having the modulated amplitude and adds the carriers to each other to produce a voltage value represented in digital notation. After receiving the digital voltage signal, the D/A converter 304 converts the digital value into an analog value as an actual voltage value and outputs the analog signal to the communication line.

The ATU-R 400 converts the analog signal received from the ATU-C 300 by the A/D converter 408 into a digital signal representing a digital voltage value. The Fourier transform unit 407 then conducts a Fourier transform for the digital signal to obtain carriers with modulated amplitude.

Each carrier obtained by the unit 407 is fed to the bit-power distribution calculating unit 410.

The unit 410 calculates an SNR value of each carrier by a downstream-directional SNR evaluator 414 for each of NEXT and FEXT. Then the unit 410 calculates a mean value of the SNR values for each carrier. FIG. 7 shows in a graph (A) a relationship between the mean SNR value at FEXT and the mean SNR value at NEXT evaluated by the evaluating unit 414. The unit 414 keeps the mean SNR value at NEXT in NEXT SNR 415 and the mean SNR value at FEXT in FEXT SNR 415.

The unit 410 includes a bit power distribution table calculator 416. Using the SNR mean value of each carrier thus obtained, the unit 416 calculates bit distribution and transmission power distribution for each noise level. The unit 416 delivers the bit distribution and the transmission power distribution to the demapping unit 406 to be stored therein and sends the bit distribution and the transmission power distribution to the mapping unit 402. FIG. 7 conceptually shows in a graph (B) a process to determine the bit distribution for each carrier according to the mean SNR value obtained by the evaluator 414.

During a training period to calculate the bit distribution for each carrier for data transmission and the transmission power distribution employed for each carrier, the mapping unit 402 assigns a predetermined number of bits of information of the bit distribution and the transmission distribution from the unit 410 to each predetermined carrier and then sends the obtained signal to the inverse Fourier transform unit 403.

The unit 403 conducts an inverse Fourier transform for the carrier sent from the unit 402 to produce a digital signal indicating a digital voltage value. The D/A converter 404 converts the digital value into an analog value as an actual voltage value and feeds the analog signal to the communication line.

The ATU-C 300 converts the analog signal from the ATU-R 400 by the A/D converter 305 into a digital signal representing a digital voltage value. The Fourier transform unit 306 conducts a Fourier transform for the digital signal to obtain each carrier with modulated amplitude.

From the carrier to which the predetermined number of bits of information is allocated, the demapping unit 307 obtains an information item of the bit distribution and an information item of the transmission power distribution and delivers the information items to the mapping unit 302. The items are stored in the unit 302.

From the two kinds of information, i.e., bit distribution information and transmission power distribution information obtained as above, the mapping unit (302, 402) selects bit distribution information and transmission power distribution according to a noise level at data transmission and carries out bit distribution and transmission power distribution to each carrier. Using bit distribution and transmission power distribution substantially and respectively equal to the bit distribution and the transmission power distribution adopted in the other communicating station, the demapping unit (307, 406) acquires data allocated to the carrier.

The ATU-C 300 includes a noise synchronization tone generator 311. The ATU-R 400 includes a clock detector 411 and a bit power distribution selector 412.

On the ATU-C 300 side, a clock signal is synchronized with timing at which the noise level varies. It is assumed in this situation that the timing of the noise change is known in advance. For example, when noise is crosstalk from a TCM ISDN cable, near end crosstalk and far end crosstalk alternately occur at an interval of time of 1.25 ms, and hence the SNR of each carrier also varies at the same interval of time. Therefore, the transmitter section of the ATU-C 300 receives a clock signal of which amplitude alters at an interval of time of 1.25 ms synchronized with timing of the noise level change. It is required for the transmitter section to transmit the clock signal to the receiver section of the ATU-R 400. For this purpose, the noise synchronization tone generator 311 produces a noise synchronization tone signal at timing synchronized with the clock signal and sends the signal to the ATU-R 400. Specifically, using a clock signal synchronized with timing of the noise level change, the generator 311 varies the amplitude of the predetermined carrier at timing synchronized with the timing of the noise level change to deliver the carrier to the inverse Fourier transform unit 403.

The clock detector 411 detects timing of the noise level change according to a change in the amplitude of the predetermined carrier produced from the unit 407. The detector 411 then transmits the timing of the noise level change to the bit power distribution selector 412.

The selecting unit 412 recognizes the timing of the noise level change according to notification from the clock detector 411 and selects, from the two kinds of bit distribution and transmission power distribution stored as above, bit distribution and transmission power distribution for data transmission according to the noise level and designates the bit distribution and the transmission power distribution to the mapping unit 402. The unit 412 also selects, from the two types of bit distribution and transmission power distribution stored in advance, bit distribution and transmission power distribution to be used for data demodulation, the bit distribution and the transmission power distribution being equal to those employed by the ATU-C 300 according to the noise level. The unit 412 then designates the selected information items to the mapping unit 402.

FIG. 8 shows a layout of a hyper-frame including 345 symbols. In the layout, the symbols on the left side of dotted line A are associated with a little crosstalk noise from the ISDN cable (occurrence of far end crosstalk). For these symbols, many bits can be allocated to a carrier. The symbols between dotted lines A and B are related to much crosstalk noise from the ISDN cable (occurrence of far end crosstalk). For the symbols, only a few bits can be allocated to a carrier.

When data transmission is started beginning at symbol 0 at timing synchronized with timing of occurrence of far end crosstalk from the ISDN cable, timing to receive a 345th symbol synchronizes with timing of a change of crosstalk noise from ISDN as shown in FIG. 8. Therefore, beginning at a subsequent 346th symbol, it is possible to start transmitting symbols at timing synchronized with timing of occurrence of far end crosstalk from the ISDN cable. For each symbol transmission sequence, the bit power distribution selector 412 beforehand stores an information item to select one of a combination of bit distribution and transmission power distribution from the two types of the bit distribution and the transmission power distribution stored in advance.

The ATU-C 300 and the ATU-R 400 include echo canceller units 313 and 314, respectively. As can be seen from FIG. 9, a frequency band for the upstream data transmission partly overlaps with a frequency band for the upstream data transmission to increase the data transmission capacity. For this purpose, the units 313 and 413 are arranged to cancel influence of reflection.

The canceller unit 413 receives a (downstream-directional) signal sent from the ATU-R 400 to the ATU-C 300. The canceller 413 subtracts the signal from a mixed signal (downstream signal+upstream signal) including the (downstream) signal sent from the ATU-R 400 to the ATU-C 300 and the (upstream) signal transmitted from the ATU-C 300 to the ATU-R 400. The canceller 413 resultantly obtains a (upstream) signal delivered from the ATU-C 300 as a communicating party and passes the upstream signal to the receiver section of the ATU-R 400. The canceller unit 313 executes similar processing like the canceller 413. The unit 313 receives a (downstream) signal fed from the ATU-R 400 to transfer the signal to the ATU-C 300.

The pseudo random signal generator 310, the noise synchronization tone generator 311, and the mapping unit 302 deliver signals to the inverse Fourier transform unit 303. However, the signals are not simultaneously delivered to the unit 303. This means that the unit 303 conducts an inverse Fourier transform for the signals at mutually different points of time to deliver the resultant signals to the D/A converter 304. These units are controlled by a sequencer (not shown in the figures). Under control of the sequencer, the generators 310 and 311 produce signals to the unit 303 at predetermined points of signal output timing. The unit 303 recognizes according to an indication from the sequencer which one of the signals is to be received.

For example, Japanese Patent Application Laid-Open No. 2003-23402 filed before the application of the present invention describes a technique regarding an xDSL transmission rate measuring apparatus. The apparatus includes a measuring unit and an analyzer. The measuring unit measures a quantity of noise from a communication cable for xDSL transmission, the quantity changing periodically, for each period synchronized with a period of change in the noise. The unit then analyzes a frequency characteristic of the noise. The analyzer determines an xDSL transmission rate according to results of analysis from the measuring unit. As a result, the apparatus makes it possible to conduct a one-directional transmission rate test in an environment in which the quantity of noise periodically varies.

Moreover, for example, Japanese Patent Application Laid-Open No. 2000-295364 describes a fast retraining method of reducing a period of time required, at occurrence of a data error during ADSL data communication, to restore the data communication. According to the method, when a dial pulse is not received within a predetermined period of time after occurrence of the error, a fast retraining sequence is conducted only if a predetermined telephone line signal is received. When the dial pulse is received within the predetermined period of time after occurrence of the error, the fast retraining sequence is conducted only if a predetermined telephone line signal is received within a second predetermined period of time or if a time-out event takes place for the second predetermined period of time.

Additionally, for example, Japanese Patent Application Laid-Open No. 2000-13343 describes a subscriber line transmission method of conducting high-speed data transmission in parallel with telephone signal transmission by use of a high frequency band of a subscriber line. In the method, from a reception signal received via the subscriber line, a signal quality output signal including noise having periodicity is extracted. The signal quality output signal is sampled by a prediction filter and is averaged to thereby predict amplitude and a period of the noise. An output waveform of the noise having periodicity is autonomously predicted to automatically select an optimal signal point layout to resultantly implement optimal transmission.

As can be seen from FIG. 4, by mounting the echo canceller units 313 and 413 respectively in the ADSL transmission devices 300 and 400, the simultaneous overlap is possible and hence long-distance ADSL data transmission can be accomplished at a higher transmission rate.

However, the communication line includes bridge taps and branches, and hence signals sent to the communicating party (a upstream signal for the ATU-R 400 and a downstream signal for the ATU-C 300) are reflected by the bridge taps and the branches to be returned to the associated devices. The signal components thus returned are also mixed with the mixed signal (downstream signal+upstream signal). The echo canceller (313, 413) cannot obtain a correct result even by use of the subtraction described above. The signal components remain as noise. When an element such as an arrester exists on the communication line, it is not possible due to a nonlinear characteristic of the element depending on cases for the canceller (313, 413) to correctly carry out the subtraction. Therefore, the signal from the canceller includes noise in this case. That is, since such noise remains in the signal resultant from the subtraction by the canceller (313, 413), it is not possible to transmit normal data, and an error occurs in some cases. Here, an arrester is a device to control a lightning surge (voltage) caused by, for example, lightning to be lower than an insulation level of associated electric appliances and devices to thereby prevent destruction thereof.

When a voltage caused by the ringing of a telephone is applied to the arrester, the characteristic of the communication line changes. This alters the transmission characteristic of the line. That is, the link speed for data transmission determined at initialization (in a training phase) cannot be used due to the change in the transmission characteristic, and hence an error occurs. When the error continuously occurs, the line (link) is disconnected and the link speed for data transmission is again set (re-initialized).

Consequently, the signal caused by the telephone ringing is recognized as noise. While the ringing is going on, noise like a burst periodically occurs. Therefore, in association with periodic occurrence of noise due to, for example, the telephone ringing, a periodic error continuously takes place. If such an error continuously occurs exceeding a predetermined period of time, it is assumed that the environment of the communication line has been changed. The line (link) is disconnected and the link speed for data transmission is again set (reinitialized) depending on cases. Consequently, in a state in which periodic noise like a burst is taking place due to, for example, the ringing of a telephone, the system assumes that the environment of the communication line has been varied. The system hence disconnects the line (link) and sets again (reinitializes) the link speed for data transmission.

According to Japanese Patent Application Laid-Open No. 2003-23402, when a quantity of noise from a communication cable for xDSL transmission periodically alters, the noise is measured for each period synchronized with a period of change in the noise to analyze a frequency characteristic of the noise. The object of this article is to make it possible to conduct a one-directional transmission rate test in an environment in which the quantity of noise periodically varies. However, consideration has not been given to a technique which prevents cable disconnection during the ADSL data communication to thereby avoid re-setting of the link speed for data transmission.

In accordance with Japanese Patent Application Laid-Open No. 2000-295364, at occurrence of a data error during ADSL data communication, a check is made to determine whether or not a system goes into the fast retraining sequence by use of a dial pulse from a telephone line. However, this article does not describe a method of detecting the dial pulse as an indication to transfer the system to the fast retraining sequence.

According to the technique described in Japanese Patent Application Laid-Open No. 2000-13343, from a reception signal received via the subscriber line, a signal quality output signal including noise having periodicity is extracted. The signal quality output signal is sampled by a prediction filter to be averaged to thereby autonomously predict an output waveform of the noise having periodicity to automatically select an optimal signal point layout, thereby implementing optimal transmission. However, consideration has not been given to a measure against periodic noise such as the ringing which occurs like a burst. Therefore, in accordance with the technique described in this article, it is difficult to extract, from the periodic noise such as the ringing taking place like a burst received via the subscriber line, a signal quality output signal including noise having periodicity to thereby predict an output waveform of the noise.

SUMMARY OF THE INVENTION

It is therefore an object of the present invention devised to solve the above problem to provide a communication quality controller and a communication quality control method which avoids, in a state of abrupt occurrence of periodically changing noise, cable disconnection and which prevents re-setting of the link speed for data transmission.

To achieve the object, the present invention has aspects as below.

In accordance with the present invention, there is provided a communication quality controller for controlling a link speed to conduct data communication. In the controller, during the data transmission at the link speed, whether or not an error occurs at a period shorter than a noise period changing periodically is monitored for a predetermined period of time. According to presences or absences of the error taking place during the monitoring period, a check is made to determine whether or not there exists a periodic noise period abruptly taking place. If it is determined that there exists a periodic noise period abruptly taking place, disconnection of an associated communication line is avoided and the data communication is conducted at the link speed.

In the communication quality controller, if there exist a plurality of presences or absences of error as a result of the monitoring conducted for a predetermined period of time, it is determined that there exists a noise period.

Additionally, in the communication quality controller, if there exists only presences of error as a result of the monitoring conducted for a predetermined period of time, it is determined that there does not exist a noise period, an associated communication line is disconnected, a link speed is determined according to a noise environment, and the data communication is conducted at the link speed.

In the communication quality controller, if there is detected an error quantity exceeding a predetermined threshold value at a period shorter than a periodic noise period, occurrence of the error is assumed; otherwise, occurrence of the error is not assumed.

Also, in the communication quality controller, the predetermined value is zero.

In addition, the communication quality controller further includes a setting module for setting the predetermined value.

In the communication quality controller, if it is determined that there exists a noise period, disconnection of the associated communication line is avoided, and after the occurrence of the noise period is terminated, the data communication is conducted at the link speed.

Furthermore, in the communication quality controller, the noise period changing periodically is a noise period which occurs abruptly.

In accordance with an aspect of the present invention, there is provided a communication quality control method for use in a communication apparatus for controlling a link speed to conduct data communication. The method includes the steps conducted by the communication device of monitoring for a predetermined period of time, during the data transmission at the link speed, whether or not an error occurs at a period shorter than a noise period changing periodically; making a check, according to presences or absences of the error taking place during the monitoring period, to determine whether or not there exists a periodic noise period abruptly taking place; and avoiding, if it is determined that there exists a periodic noise period abruptly taking place, disconnection of an associated communication line and conducting the data communication at the link speed.

In addition, the communication quality control method further includes the step of determining that there exists a noise period if there exist a plurality of presences or absences of error as a result of the monitoring conducted for a predetermined period of time.

Also, the communication quality control method further includes the steps of determining, if there exists only presences of error as a result of the monitoring conducted for a predetermined period of time, that there does not exist a noise period, disconnecting an associated communication line, determining a link speed according to a noise environment, and conducting the data communication at the link speed.

The communication quality control method further includes the steps of assuming occurrence of the error if there is detected an error quantity exceeding a predetermined threshold value at a period shorter than a periodic noise period and not assuming occurrence of the error if the error quantity is not detected.

In the communication quality control method, the predetermined value is zero.

The communication quality control method further includes the step of setting the predetermined value.

Moreover, the communication quality control method further includes the steps of avoiding, if it is determined that there exists a noise period, disconnection of the associated communication line and conducting, after the occurrence of the noise period is terminated, the data communication at the link speed.

In the communication quality control method, the noise period changing periodically is a noise period which occurs abruptly.

In a communication quality controller and a communication quality control method in accordance with the present invention, during the data transmission at a beforehand set link speed, whether or not an error occurs at a period shorter than a noise period changing periodically is monitored for a predetermined period of time. According to presences or absences of the error taking place during the monitoring period, a check is made to determine whether or not there exists a periodic noise period abruptly taking place. If it is determined that there exists a periodic noise period abruptly taking place, disconnection of an associated communication line is avoided and the data communication is conducted at the link speed. As a result, in a state of abrupt occurrence of periodically changing noise, it is possible to avoid cable disconnection to prevent resetting of the link speed for data transmission. The periodically changing noise which occurs periodically includes, for example, the telephone ringing.

BRIEF DESCRIPTION OF THE DRAWINGS

The objects and features of the present invention will become more apparent from the consideration of the following detailed description taken in conjunction with the accompanying drawings in which:

FIG. 8 is a diagram showing a layout of a hyperframe;

DESCRIPTION OF THE PREFERRED EMBODIMENTS

Figure 10:
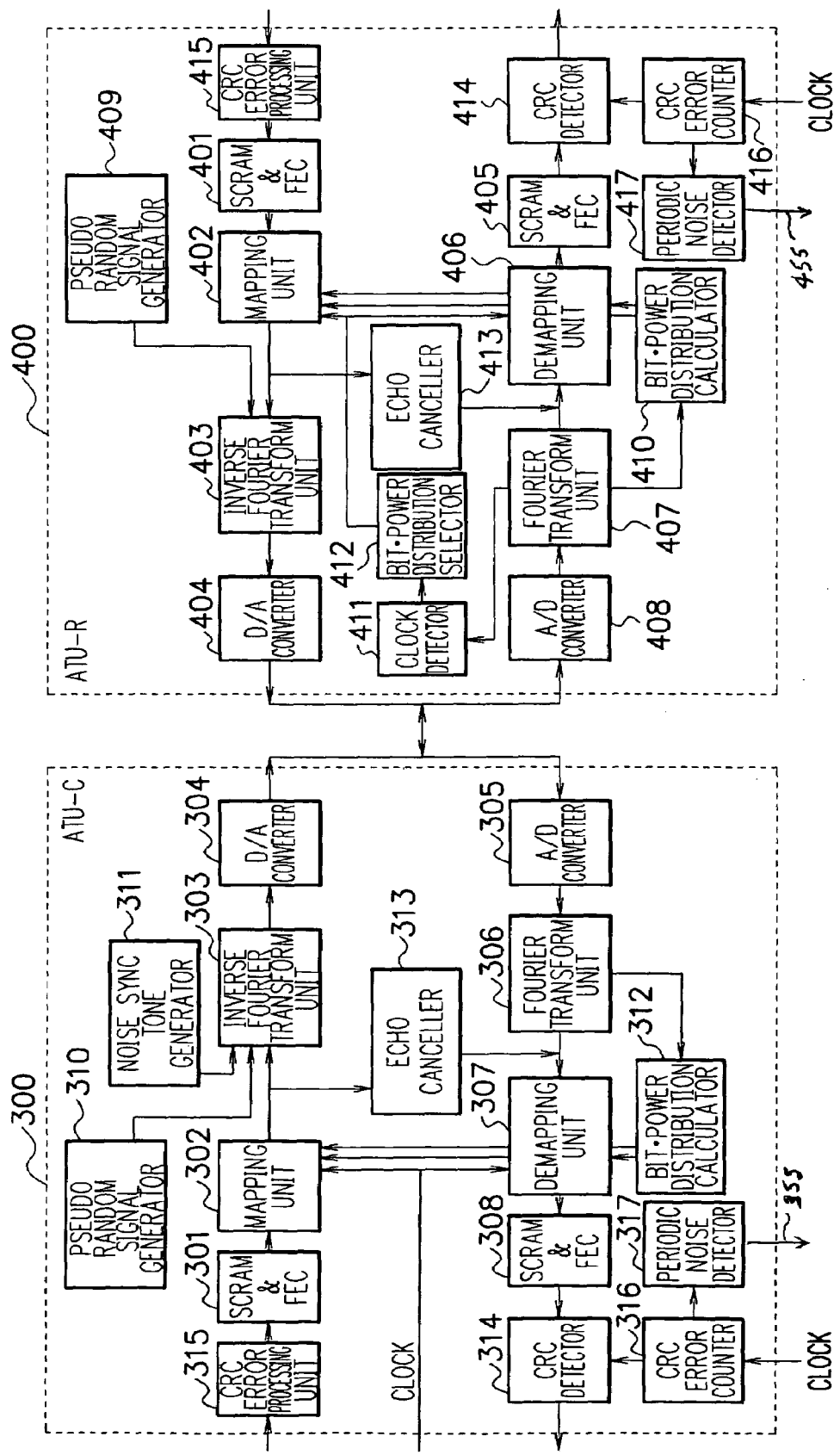
FIG. 10 is a schematic block diagram showing a system configuration of a multicarrier transmission system in accordance with the present invention.

Referring next to FIG. 10, description will be given of an aspect of a multicarrier transmission system in accordance with the present invention.

In the system, during data transmission at a link speed beforehand designated for data transmission, a CRC counter (316, 416) monitors for a predetermined period of time to determine whether or not an error occurs at a period shorter than a period of periodically changing noise in a CRC error detector (314, 414) to count presence/absence of error occurrence. The counter (314, 414) counts a period of time of occurrence of an error (presence) or a period of time in which an error does not occur (absence). According to the presence or absence of an error which takes place during the monitor period of time and which is measured by the counter (314, 414), a periodic noise detector (317, 417) makes a check to determine whether or not the error noise is a periodic noise occurring abruptly. If the error noise is such a periodic noise, the line disconnection is avoided, and after the occurrence of the period noise is terminated, the data transmission is conducted at the link speed set as above. If the error noise is other than such a periodic noise, the line disconnection is conducted and a link speed is again set according to the noise environment to carry out the data transmission at the link speed. As a result, when the detector (317, 417) determines abrupt occurrence of the periodic noise period, the line disconnection is avoided. When the occurrence of the periodic noise is terminated, the data transmission can be achieved without setting a link speed again.

The abrupt occurrence of the noise period is determined as below. The CRC error counter (316, 416) counts each event of "presence" or "absence" of error occurrence during the predetermined period of time. If the result of the counting operation indicates a plurality of error events, the detector (317, 417) determines abrupt occurrence of the noise period, and outputs a communication line disconnection signal 355, 455 to cause disconnection of the associated communication line. If it is determined that only "presence" of occurrence of an error has been counted, the detector (317, 417) does not determine abrupt occurrence of the noise period, but determines occurrence of continuous noise. Therefore, occurrence of continuous noise and abrupt occurrence of periodic noise can be discriminated from each other using a simple counter.

The CRC error counter (316, 416) determines presence or absence of occurrence of an error according to the detector (317, 417) to count the presence or absence as below. When a quantity of error which has a period shorter than a periodic noise period and which is more than a predetermined threshold value is detected, the counter (316, 416) determines occurrence of error and counts "presence of error occurrence". When a quantity of error equal to or less than a predetermined threshold value is detected, the counter (316, 416) does not determine occurrence of error and counts "absence of error occurrence". The threshold value can be set to an arbitrary value, e.g., zero. It is also possible to count presence or absence of occurrence of error when predetermined changes (increase and decrease) in quantity of error are detected at an interval of time less than a periodic noise period.

In the ADSL transmission device, when noise is received, an error takes place. When a continuous error occurs, the device disconnects the link and then determines a link speed again according to a noise state (environment) of each frequency.

For example, due to occurrence of periodic noise taking place suddenly or abruptly like the ringing of a telephone, error continuously occurs in the ADSL transmission device. As a result of the error occurrence, the device disconnects the link (communication line) and sets again the link speed depending on cases. The telephone ringing is automatically terminated with a lapse of a predetermined period of time and then the associated error disappears. Therefore, at occurrence of error due to such a periodic noise as the telephone ringing, if the ADSL device waits at least for the predetermined period of time of the ringing, the error does not occur in the device. That is, in a case in which periodic noise such as the ringing occurs and a continuous error takes place in the device, it is only necessary for the device to disconnect the link. The device need not reset the link speed. With a lapse of the predetermined period of time, the device can conduct the data transmission at the link speed used before the error occurs. As above, at occurrence of error due to a periodic noise taking place suddenly like the telephone ringing, the ADSL device disconnects the link. Thereafter, when the error occurrence is terminated, the device transmits data at the link speed employed prior to the error occurrence. Resultantly, even when an error occurs due to a periodic noise taking place abruptly like the telephone ringing, the ADSL device can conduct the data transmission without resetting the link speed.

Embodiments

Referring now to the accompanying drawings, description will be given of an embodiment of a multicarrier transmission system in accordance with the present invention.

First, description will be given of a system configuration of a multicarrier transmission system in accordance with the present invention.

Figure 1:
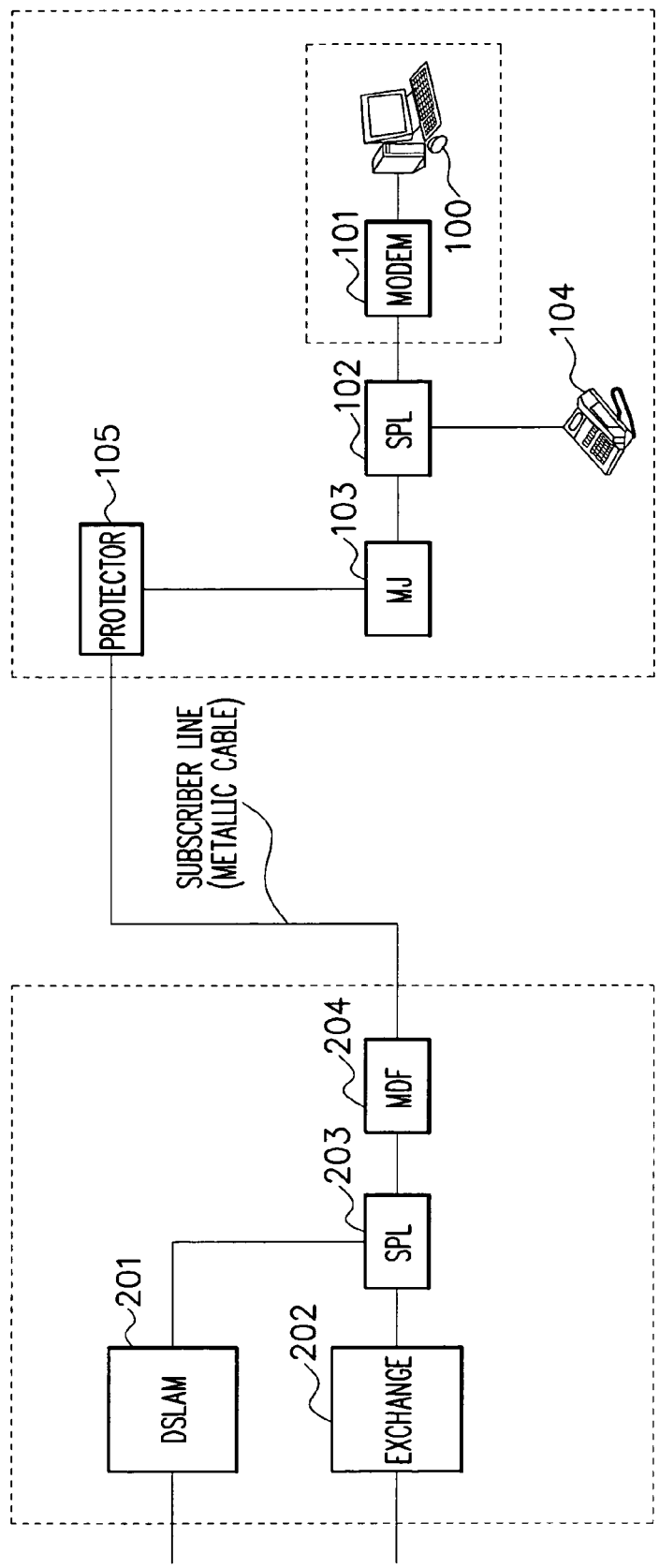
FIG. 1 is a block diagram showing an example of a configuration of an ADSL transmission system to receive ADSL services.
Figure 2:
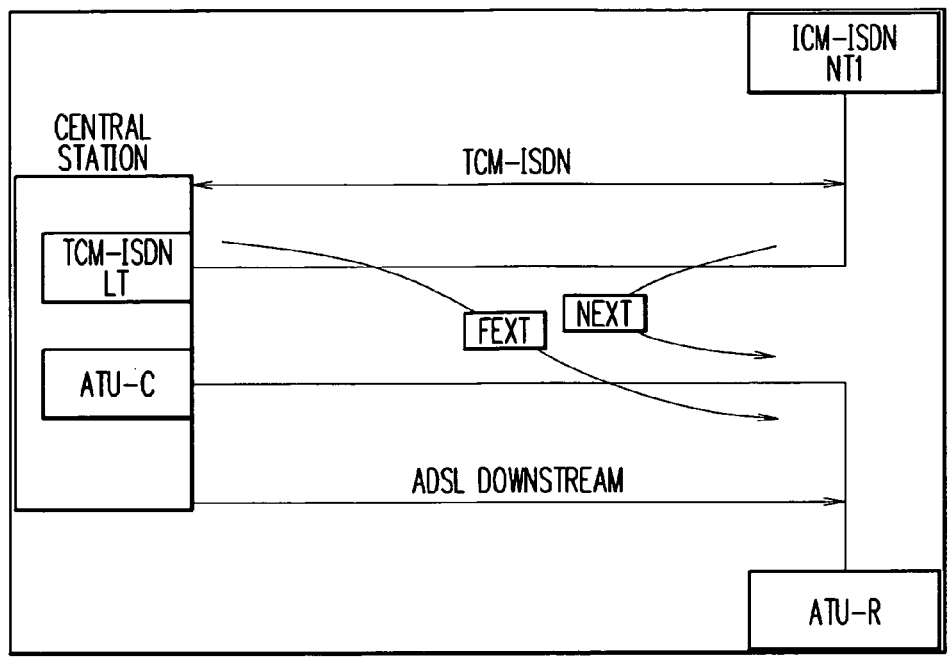
FIG. 2 is a schematic diagram to explain crosstalk noise from an ISDN cable.
Figure 3:
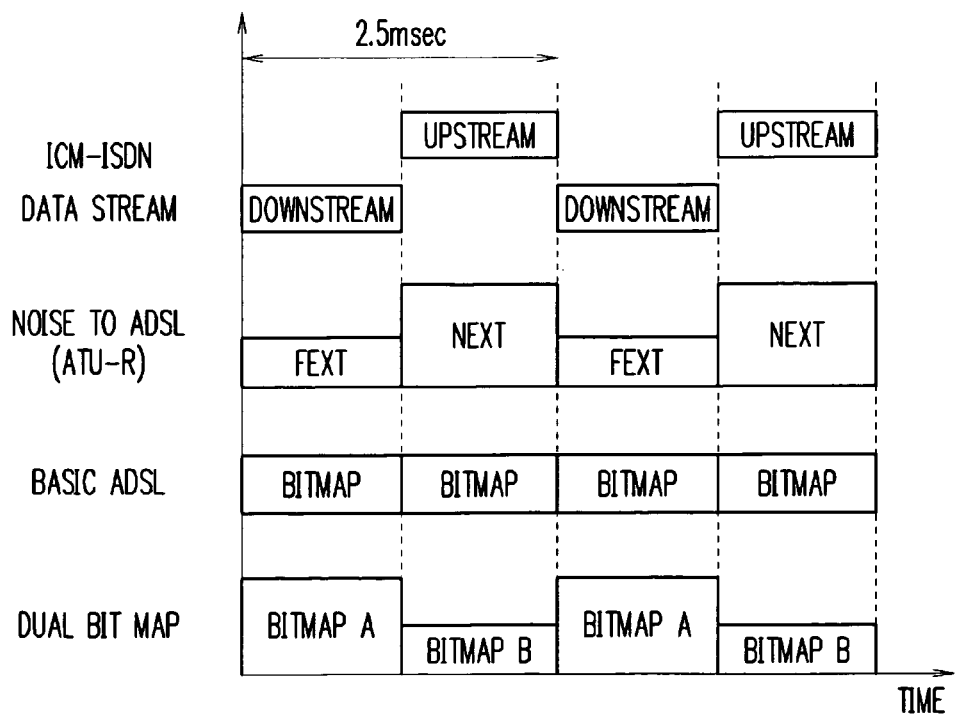
FIG. 3 is a signal timing chart indicating noise quantities of near end crosstalk and far end cross talk.
Figure 4:
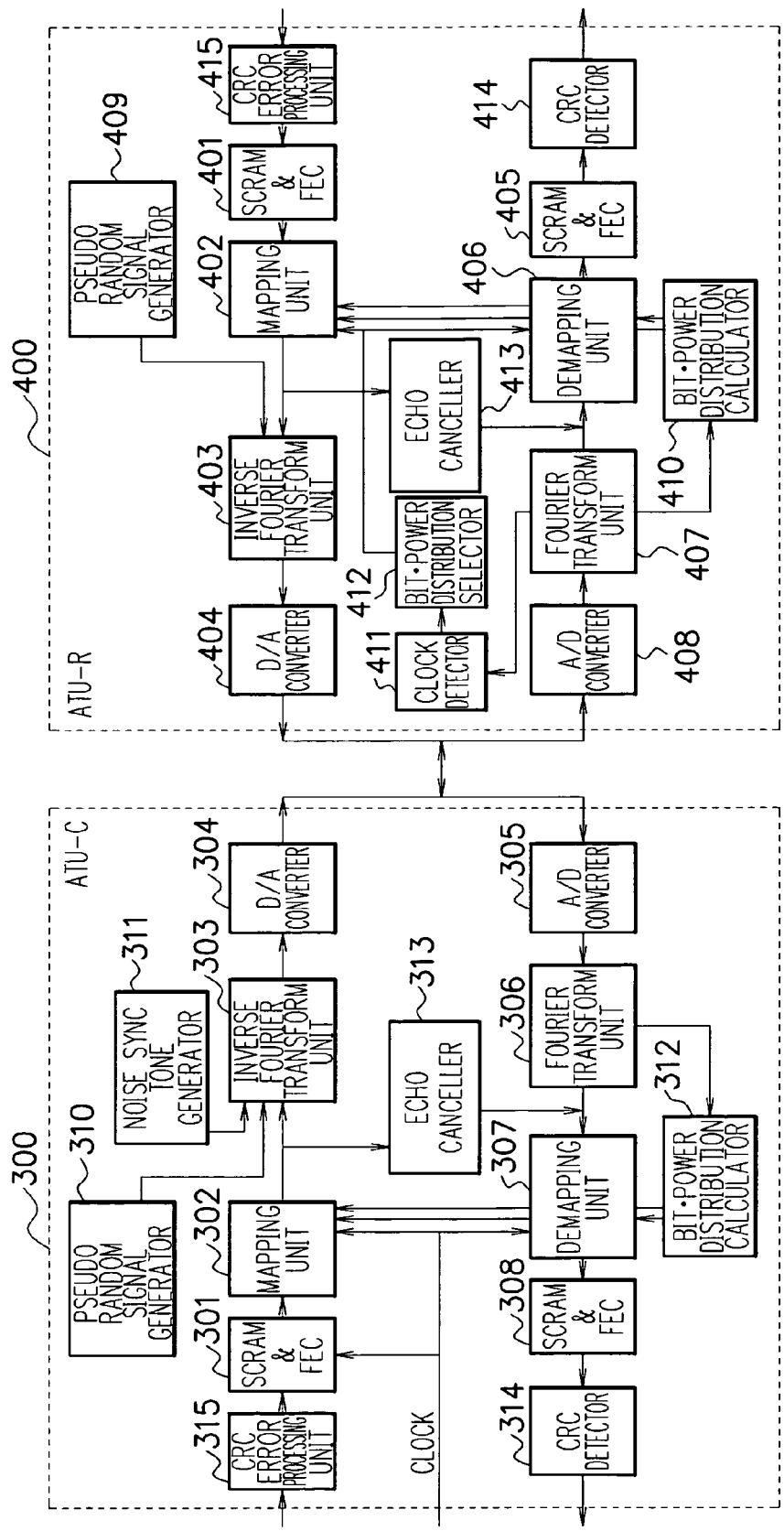
FIG. 4 is a block diagram showing a system configuration of a multicarrier transmission system of the prior art.
Figure 5:
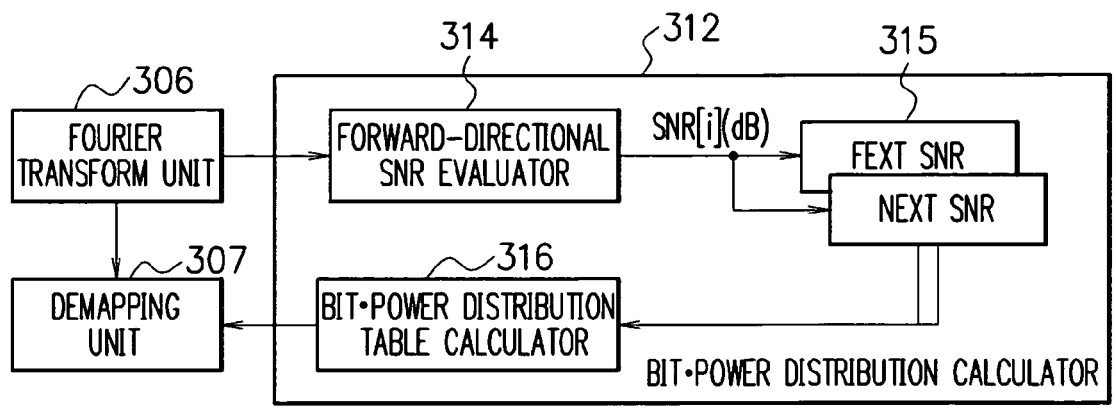
FIG. 5 is a block diagram schematically showing a configuration of a bit power distribution calculator.
Figure 6:
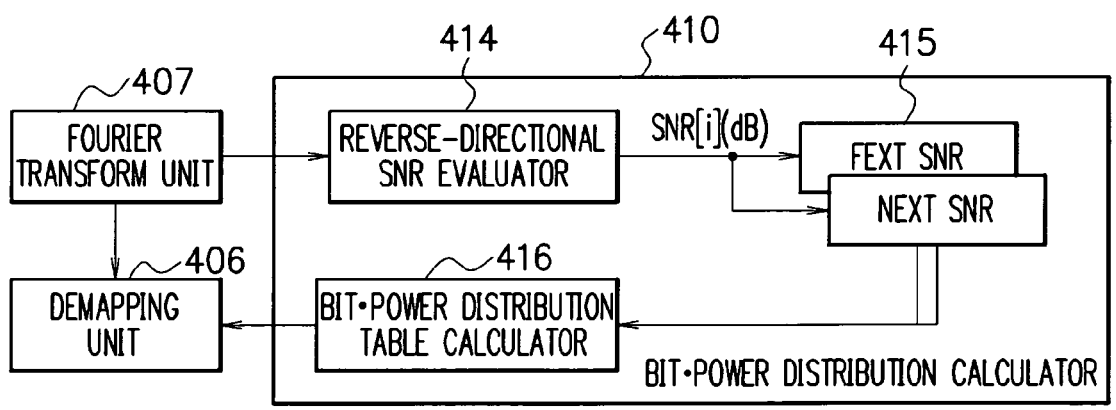
FIG. 6 is a schematic block diagram showing a configuration of a bit power distribution calculator.
Figure 7:
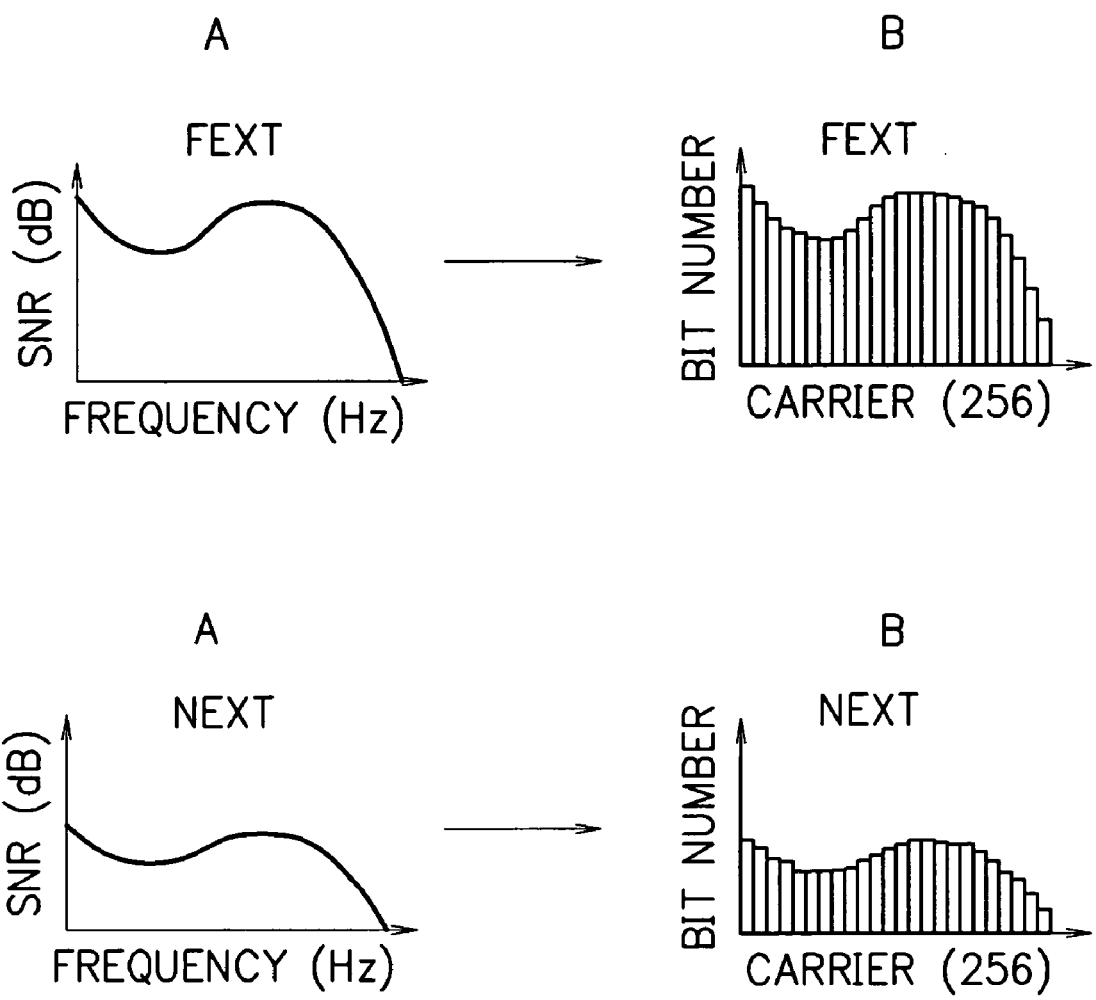
FIG. 7 is a diagram schematically showing a bit distribution calculation method.
Figure 9:
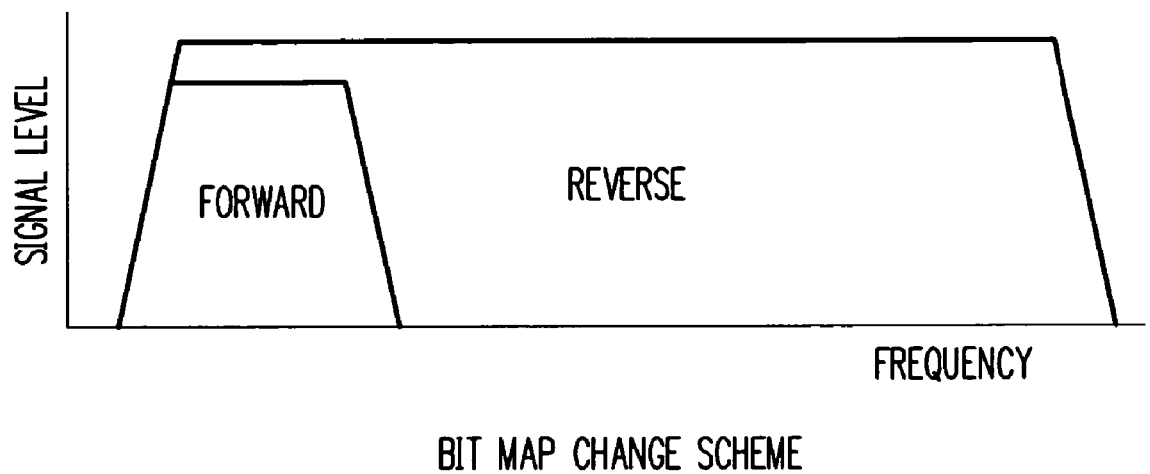
FIG. 9 is a graph showing a frequency band for data transmission using an echo canceller.

The system is implemented by adding CRC error counters 316 and 416 and periodic noise detectors 317 and 417 respectively to the ATU-C 300 and the ATU-R 400 of the multicarrier transmission system shown in FIG. 4. It is also possible to configure the system such that clock signal generators are additionally disposed to supply clock signals to the counters 316 and 416 or the counters 316 and 416 to generate the clock signals.

Using a predetermined expression, the detector (314, 414) executes CRC processing for data for which the scram & FEC unit 308 has conducted the scrambling and error correction to restore correct data and to thereby detect occurrence of a CRC error. For this purpose, the counter (316, 416) monitors for a predetermined period of time to determine, according to a clock signal having a period shorter than a period of a periodically changing noise, whether or not a CRC error has occurred in the detector (314, 414). If a CRC error occurs in the detector (314, 414) when a clock signal having a period less than a period of a periodically changing noise is supplied from an external device, the counter (316, 416) accomplishes a counting operation for "presence of error occurrence". Otherwise, the counter (316, 416) counts "absence of error occurrence". By conducting the counting of "presence or absence of CRC error occurrence" by the counter (316, 416), a period in which error occurs in the detector (314, 414) can be discriminated from a period in which there does not occur any error in the detector (314, 414).

The CRC error counter (316, 416) determines "presence or absence of occurrence of a CRC error" according to the detector (317, 417) to count the presence or absence as below. When a quantity of a CRC error which has a period shorter than a periodic noise period and which is more than a predetermined threshold value is detected, the counter (316, 416) determines occurrence of a CRC error to count "presence of error occurrence". When a quantity of error equal to or less than a predetermined threshold value is detected, the counter (316, 416) does not determine occurrence of a CRC error and counts "absence of error occurrence". The threshold value can be set to an arbitrary value, e.g., zero such that when an error quantity exceeding zero is detected, occurrence of a CRC error is assumed and "presence of error occurrence" is counted. When an error quantity equal to zero is detected, it is assumed that there does not occur a CRC error and "absence of error occurrence" is counted. It is also possible to count "presence or absence of occurrence of a CRC error" according to a gradient of an error quantity detected by the detector (314, 414). That is, on the basis of the gradient of the error quantity, when predetermined changes (increase and decrease) in quantity of error are detected (increase and decrease in quantity of error regarded as a period of a periodic noise), it is also possible to determine occurrence of a CRC error.

According to the count of "presence or absence of CRC error occurrence" attained as a result of a predetermined period of monitoring by the counter (316, 416), the detecting unit (317, 417) determines whether or not a periodic noise period occurring like a burst is present. If it is recognized that the value of the count from the counting unit (316, 416) indicates a plurality of occurrence of the associated events, presence of a periodic noise period occurring like a burst is assumed or determined. The line disconnection is avoided, and after the occurrence of period noise is terminated, the data transmission is conducted at a predetermined link speed. As a result, when the detector (317, 417) determines occurrence of a noise period appearing like a burst, the line disconnection can be avoided, and the data transmission can be carried out without resetting the link speed.

If it is determined that only "presence of occurrence of an error" has been counted as a result of the monitoring by the counter (316, 416) for a predetermined period of time, the detector (317, 417) determines that this does not indicate the noise period occurring like a burst (i.e., continuous noise). In this situation, the communication line is once disconnected and the link speed is set again according to the noise environment to accomplish the data transmission at the link speed.

Figure 11:
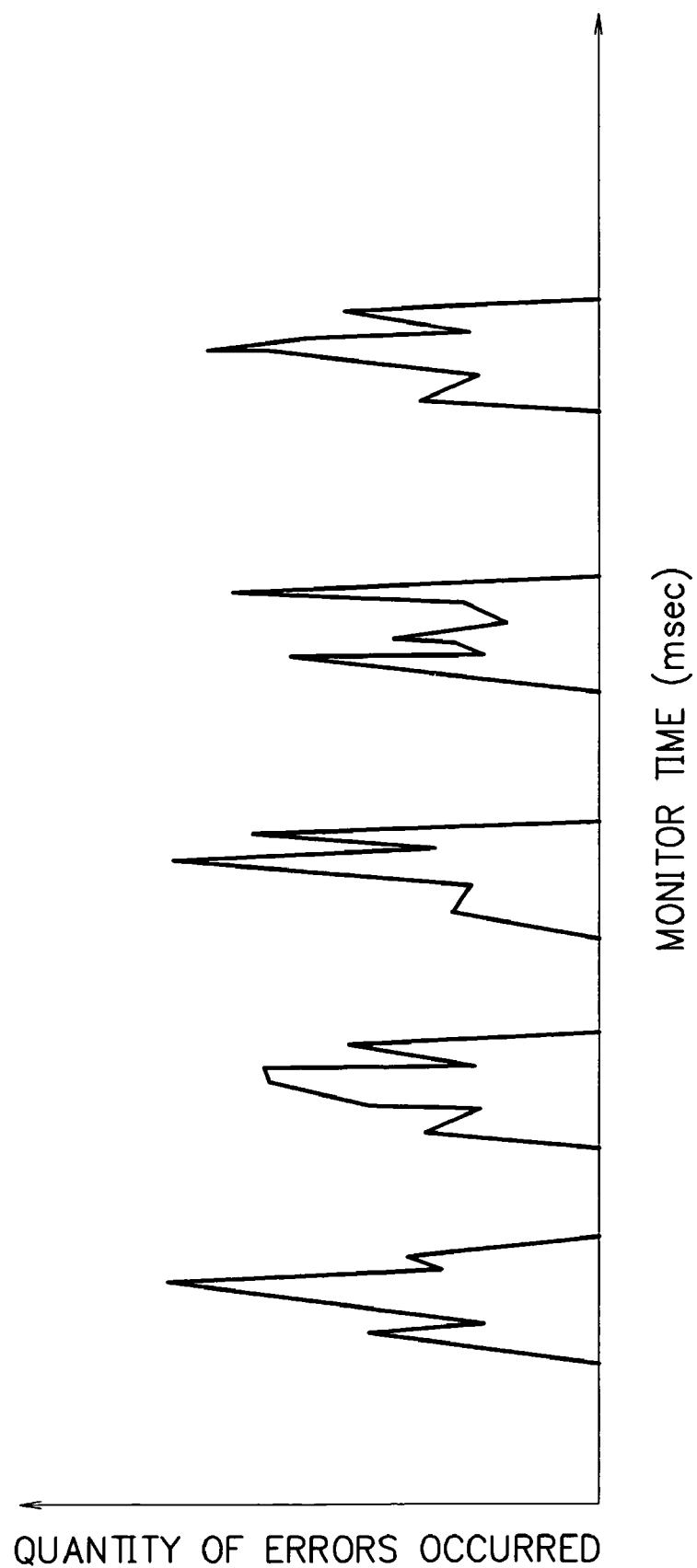
FIG. 11 is a graph to explain detection of occurrence of a CRC error as a result of a CRC check in an CRC error detector (314, 414)
Figure 12:
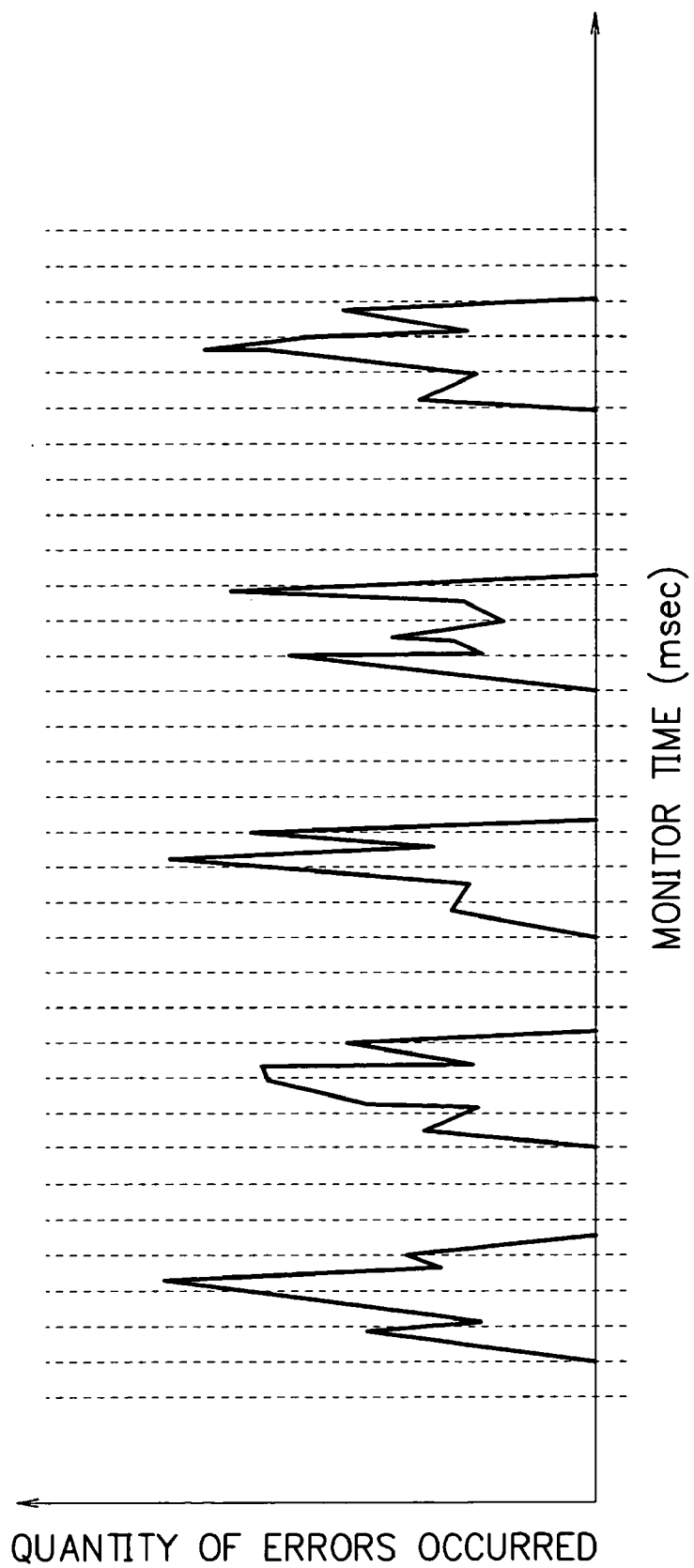
FIG. 12 is a graph showing results of operation in which each time a clock signal having a shorter period than periodic noise is supplied to the CRC error detector (314, 414), the detector (314, 414) determines presence or absence of occurrence of a CRC error to count the number of events of CRC errors.

Referring now to FIGS. 11 and 12, description will be given of processing executed when a noise period occurring like a burst takes place. In the description of the processing, the telephone ringing is adopted as an example of a signal having a noise period occurring like a burst.

At occurrence of the ringing, a periodic noise takes place like a burst in association with the ringing. Resultantly, the detecting unit (314, 414) detects occurrence of a CRC error due to a periodic noise period as shown in FIG. 11. In the processing of FIG. 11, according to data received from the scram & FEC unit (308, 405), the detector (314, 414) conducts CRC processing to detect occurrence of a CRC error. In FIG. 11, an abscissa indicates time (ms) and an ordinate denotes an error occurrence quantity.

As can be seen from FIG. 12, each time a clock signal (having a period less than that of a periodic noise) is fed to the counter (316, 416), the detector (314, 414) makes a check for occurrence of a CRC error to count "presence or absence of CRC error occurrence".

The counting is carried out as below. If an error occurrence quantity larger than zero is detected at a period shorter than a periodic noise period, occurrence of a CRC error is assumed. The counter (316, 416) consequently counts "presence of error occurrence". Otherwise, the counter (316, 416) does not assume the error occurrence and accordingly counts "absence of error occurrence".

The detecting module (317, 417) determines whether or not the event indicates periodic noise period occurring like a burst according to the count value of "presence or absence of CRC error occurrence" counted at a period shorter than the periodic noise period by the counter (316, 416). If "presence or absence of error occurrence" counted at a period shorter than the periodic noise period and obtained as a result of the monitoring for a predetermined period of time indicates a plurality of occurrence of the associated events, the detecting unit (317, 417) determines presence of a noise period occurring like a burst and avoids the line disconnection.

If "presence or absence of error occurrence" counted at a period shorter than the periodic noise period and obtained as a result of the monitoring for a predetermined period of time indicates that only "presence of error occurrence" has been counted, the detector (317, 417) determines that this does not indicate a noise period occurring like a burst, conducts the like disconnection, and sets the like speed again according to the noise environment to conduct the data transmission at the link speed. As a result, when the detector (317, 417) determines occurrence of a periodically changing noise period appearing like a burst, the line disconnection can be avoided. When the occurrence of the period error is terminated, the data transmission can be carried out without resetting the link speed.

Figure 13:
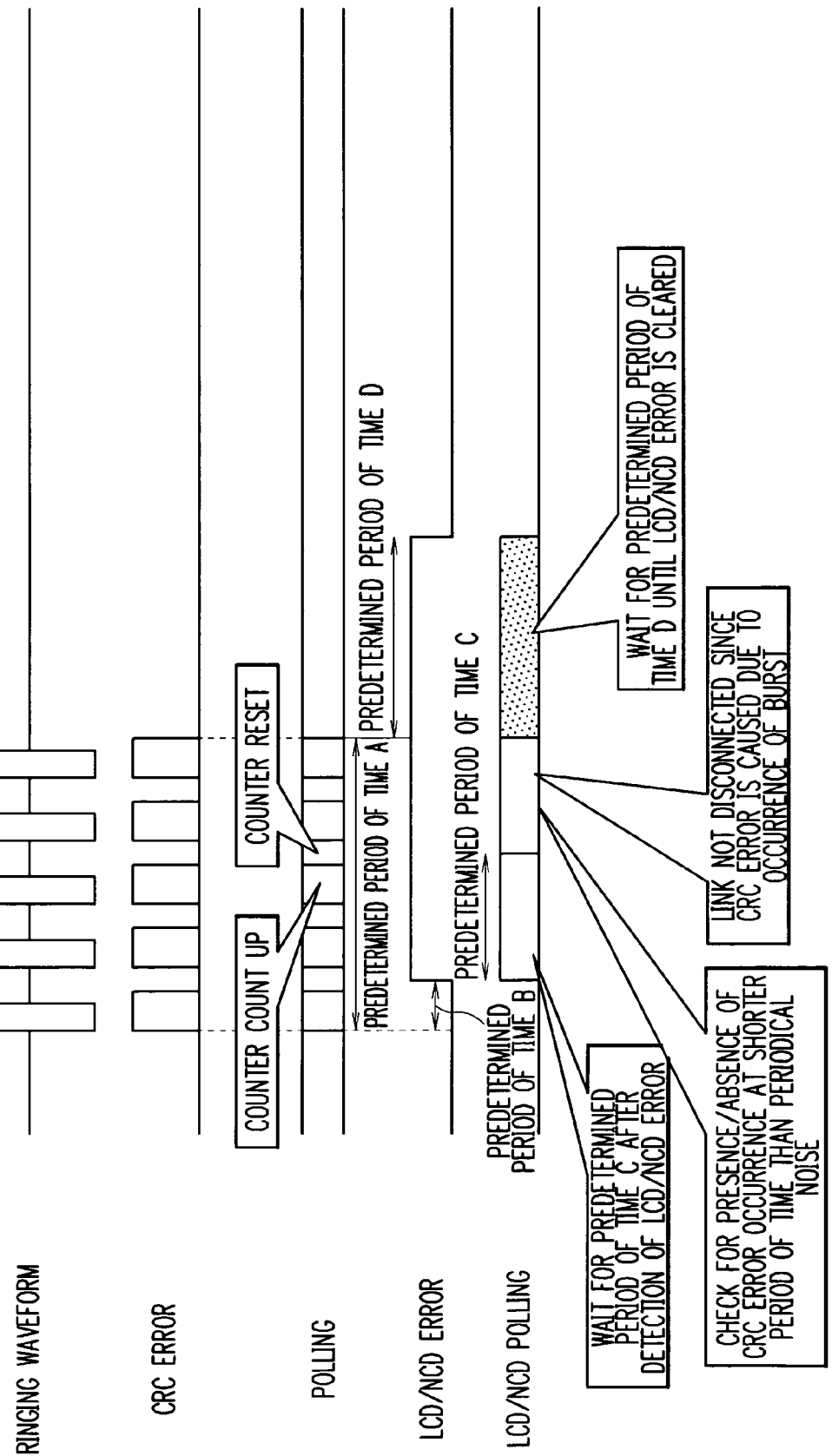
FIG. 13 is a signal timing chart showing operation to disconnect a communication line at occurrence of a periodic noise such as the ringing taking place like a burst.

Referring to FIG. 13, description will be given of processing to avoid the line disconnection due to the ringing.

When the ringing occurs, a periodic ringing waveform is detected as shown in FIG. 13. In response thereto, the detector (314, 414) detects a CRC error. The counter (316, 416) monitors for predetermined period of time A to determine whether or not the detector (314, 414) has detected a CRC error at a period less than a periodically occurring noise period to thereby count "presence or absence of CRC error occurrence" (Polling). If a CRC error occurs, a Loss of Cell Delineation (LCD)/No Cell Delineation (NCD) error is detected with a delay of predetermined period of time B. After detecting the LCD/NCD error, the detecting module (317, 417) enters and stays in a wait state for predetermined period of time C and then conducts the monitoring for predetermined period of time A without disconnecting the communication line. The detecting module (317, 417) makes a check, according to the count value of "presence or absence of CRC error occurrence" obtained during the monitoring, to determine whether or not the event indicates a noise period occurring like a burst. If it is determined, as a result of the monitoring for predetermined period of time A by the CRC error counter, that "presence of CRC error occurrence" indicates a plurality of occurrence of the associated events, occurrence of the ringing is assumed and the line disconnection is avoided. The system enters and stays in a wait state for predetermined period of time D until the LCD/NCD error is terminated. When the occurrence of the ringing is finished, the system conducts the data transmission at a predetermined link speed. As a result, when occurrence of the ringing is assumed, the system can conduct the data transmission without resetting the link speed after the occurrence of the ringing is terminated.

In the multicarrier transmission system, the configurations of the transmitter and receiver sections of the ATU-C 300 and the ATU-R 400 are not particularly limitative. The configurations can be modified in various fashions only if the operation is possible as below. As can be seen from the above embodiments, in the detector (314, 414) of the respective receiver sections of the ATU-C 300 and ATU-R 400, the counter (316, 416) monitors for predetermined period of time A to determine whether or not error occurs at a period less than the periodically changing noise period. According to "presence or absence of error occurrence" during the monitoring for predetermined period of time A, the counter (316, 416) determines whether or not the resultant event indicates a periodic noise period. If the counter (316, 416) determines that the event indicates a periodic noise period occurring like a burst, the line disconnection is avoided, and the data transmission is conducted at a predetermined link speed after the occurrence of the periodic noise is terminated. Otherwise, the line disconnection is carried out, the link speed is designated again, and the data transmission is conducted at the link speed.

Figure 14:
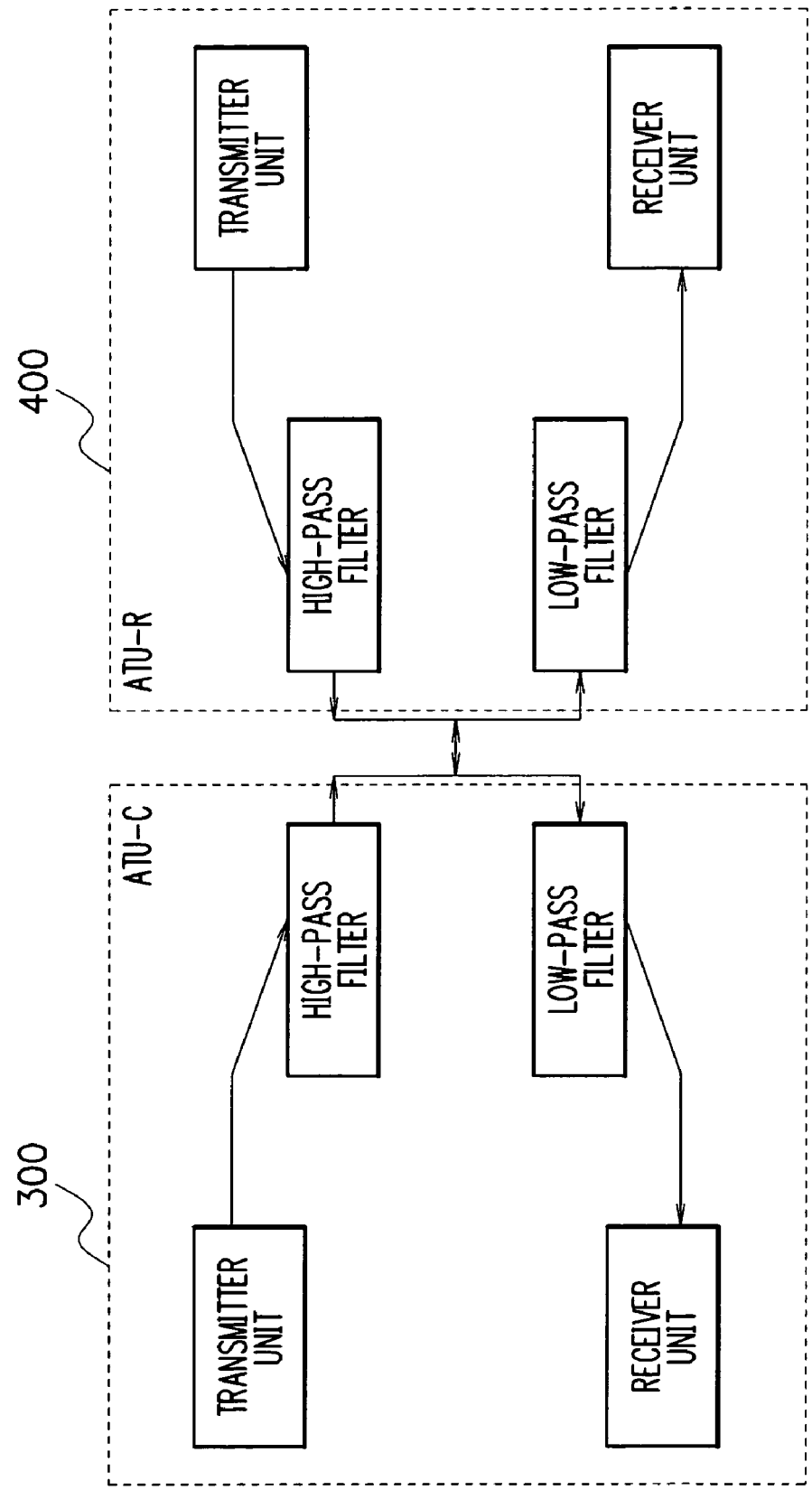
FIG. 14 is a block diagram showing a second system configuration of a multicarrier transmission system in accordance with the present invention.

As shown in FIG. 14, it is possible to dispose a high-pass filter to remove a side lobe occurring from a frequency band used for the data transmission in the downstream direction in each of a second stage of the transmitter section of the ATU-C 300 and a first stage of the receiver section of the ATU-R 400. Similarly, there may be disposed a low-pass filter to remove a side lobe occurring from a frequency band used for the data transmission in the upstream direction in each of a first stage of the receiver section of the ATU-C 300 and a second stage of the transmitter section of the ATU-R 400.

In conjunction with the embodiments, description has been given of a measure to avoid the line disconnection in a multicarrier system including the echo cancellers 313 and 413. However, the line disconnection avoiding measure in accordance with the present invention is applicable also to a multicarrier system not including the echo cancellers 313 and 413 for the following reason. That is, the measure is not limited to occurrence of errors caused by an echo canceller or an arrester, but is applicable to a case in which a periodic error takes place like a burst due to cause other than those above, for example, due to a protector.

The embodiments described above are preferable embodiments of the present invention. However, the present invention is not restricted by the embodiments. The embodiments can be changed or modified without departing from the scope and spirit of the present invention. For example, in the description, the present invention is applied to an ADSL system. However, the present invention is also applicable to a Symmetric Digital Subscriber Line (SDSL) system, a High speed Digital Subscriber Line (HDSL) system, and a Very high speed Digital Subscriber Line (VDSL) system. The present invention is not limited to a crosstalk noise environment to which the TCM-ISDN is adjacent, but is applicable also to other noise environments. Occurrence of a periodic noise period taking place like a burst such as the ringing is identified according to occurrence of error in the embodiments. However, according to a voltage applied to a telephone line, it is also possible to identify a periodic noise occurring like a burst.

The communication quality controller and the communication quality control method in accordance with the present invention are applicable to any communication apparatuses conducting data communication.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A communication quality controller for controlling a link speed to conduct data communication, comprising:
   means for monitoring, for a predetermined period of time during the data transmission at the link speed, whether or not an error occurs at a period shorter than a noise period changing periodically;
   means for checking to determine, according to presence or absence of the error taking place during the monitoring period, whether or not there exists a periodic noise period abruptly taking place; and
   wherein, when the checking means determines that there exists a periodic noise period abruptly taking place, disconnection of an associated communication line is avoided and the data communication is conducted at the link speed,
   wherein:
   if there is detected an error quantity exceeding a predetermined threshold value at a period shorter than a periodic noise period, occurrence of the error is determined; and
   otherwise, occurrence of the error is not determined,
   wherein the controller further comprises:
   a counter for counting a number of errors that occur during the predetermined period of time; and
   a timer for counting from zero up to a second predetermined period of time when an error has occurred during one of the predetermined periods of time,
   wherein the counter is cleared when no error has occurred during the second predetermined period of time as counted by the timer.

2. A communication quality controller in accordance with claim 1, wherein if there exist a plurality of presences of error as a result of the monitoring conducted for a predetermined period of time, it is determined that there exists a noise period.

3. A communication quality controller in accordance with claim 1, wherein if there exists only zero or one occurrence of the error as a result of the monitoring conducted for a predetermined period of time, it is determined that there does not exist a noise period, the associated communication line is disconnected, a link speed is determined according to a noise environment, and the data communication is conducted at the link speed.

4. A communication quality controller in accordance with claim 1, wherein the predetermined threshold value is zero.

5. A communication quality controller in accordance with claim 1, further comprising setting means for setting the predetermined threshold value based on a period of a telephone ringing signal.

6. A communication quality controller in accordance with claim 1, wherein if it is determined that there exists a noise period, disconnection of the associated communication line is avoided, and after the occurrence of the noise period is terminated, the data communication is conducted at the link speed.

7. A communication quality controller in accordance with claim 1, wherein the noise period changing periodically is a noise period which occurs abruptly, wherein the communication quality controller further comprises:

high-pass filter means for performing frequency filtering so as to remove a first side lobe occurring from a frequency band used for data transmission and data reception; and low-pass filter means for performing frequency filtering so as to remove a second side lobe occurring from the frequency band used for data transmission and data reception.

8. A communication quality controller in accordance with claim 1, wherein occurrence of the periodic noise period abruptly taking place corresponds to a ringing signal occurring on the associated communication line.

* * * * *